United States Patent [19]

Wilson et al.

[11] Patent Number: 4,758,635
[45] Date of Patent: Jul. 19, 1988

[54] POLYAMINDOAMINE BASED METAL ION CONTROL COMPOUND

[75] Inventors: David A. Wilson, Richwood; Druce K. Crump, Lake Jackson; Jaime Simon, Angleton, all of Tex.

[73] Assignee: The Dow Chemical Company, Midland, Mich.

[21] Appl. No.: 626,801

[22] Filed: Jul. 2, 1984

[51] Int. Cl.$^4$ ............................................. C08G 83/00
[52] U.S. Cl. ................................... 525/418; 525/539; 528/332; 528/363
[58] Field of Search ................ 525/418, 539; 528/332, 528/363

[56] References Cited

U.S. PATENT DOCUMENTS

| | | | |
|---|---|---|---|
| 2,599,807 | 6/1952 | Bersworth | 260/500 |
| 2,609,390 | 9/1952 | Bersworth | 260/500 |
| 3,331,773 | 7/1967 | Gunderson et al. | 210/58 |
| 3,336,221 | 8/1967 | Ralston | 210/58 |
| 3,674,804 | 7/1972 | Redmore | 260/309.6 |
| 4,051,110 | 9/1977 | Quinlan | 260/72 R |

OTHER PUBLICATIONS

"Toward a Better Understanding of Commercial Organophosphonates", Roderick A. Campbell, Proced. Int. Water Conf., Eng. Soc., West PA, 41, pp. 167–174, (1980).

"Scale and Deposit Control in Cooling Water Systems", Jeffrey R. Townsend, Karl W. Heiman, Proced. Int. Water Conf., Eng. Soc. West PA, 39, pp. 89–99, (1978).

*Primary Examiner*—Harold D. Anderson
*Attorney, Agent, or Firm*—A. Cooper Ancona

[57] ABSTRACT

New derivatives of polyamidoamines which contain at least one phosphonic, alkylphosphonic, hydroxyalkyl, carboxyalkly, alkylsulfonic or salts of the acid groups as substituents on a nitrogen are useful as chelating and/or threshold agents for preventing precipitation of metal ions. The preferred agents contain phosphonic acid groups or their salts.

29 Claims, No Drawings

POLYAMINDOAMINE BASED METAL ION CONTROL COMPOUND

BACKGROUND OF THE INVENTION

The present invention relates to a group of polymers known as polyamidoamines which may be either linear or branched chain polymers. some of these polymers, which are initiated with ammonia, or a primary or secondary amine, are disclosed in a copending, commonly owned, application of another inventor, D. A. Tomalia, et al, under the title, "Dense Star Polymers", Ser. No. 565,686, filed Dec. 27, 1983, now U.S. Pat. No. 4,558,120, which is a continuation-in-part of an earlier application, Ser. No. 456,226, filed Jan. 7, 1983, now U.S. Pat. No. 4,507,466.

The compounds of the present invention are derivatives of the above polyamidoamines in which at least some of the amine hydrogens have been substituted and preferably in which at least one substituent is a phosphonic acid or alkylenephosphonic acid group or a salt thereof.

SUMMARY OF THE INVENTION

Those polyamidoamine polymers which have been found useful as chelating and/or threshold agents have the structure:

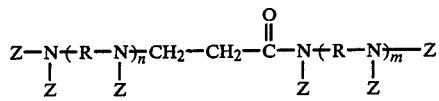

wherein Z is at least one of

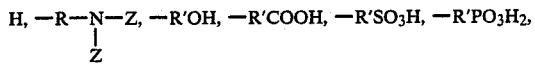

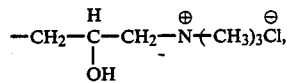

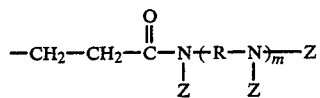

and wherein the acid groups can be in the form of alkali, alkaline earth or ammonium salts, R and R' are saturated hydrocarbon residues having from 1 to 6 and 1 to 4 carbon atoms, respectively, and m and n are 0 to 10 and wherein at least one Z is not hydrogen.

DETAILED DESCRIPTION OF THE INVENTION

The polymers which are precursors of the derivatives which are the subject of the present invention are made by first reacting ammonia or an amine with an excess of an α,β-ethylenically unsaturated carboxylic acid ester, e.g. methyl acrylate (MA), at room temperature in methanol solution with stirring and then completing the reaction by allowing the reaction mixture to stand for a sufficient period of time, after which the excess ester is removed. The product is the Michael's addition product of ammonia or the amine with one mole of ester added for each mole of hydrogen on the nitrogen nucleus of the ammonia or amine molecule. This product is then reacted in methanol with an excess of a polyamine, e.g. ethylenediamine (EDA), at room temperature for a sufficient period of time to react one mole of diamine for each ester group in the Michael's addition product. The resulting product for the reaction between the Michael's addition product and the diamine wherein $NH_3$, MA and EDA are employed has the following structure:

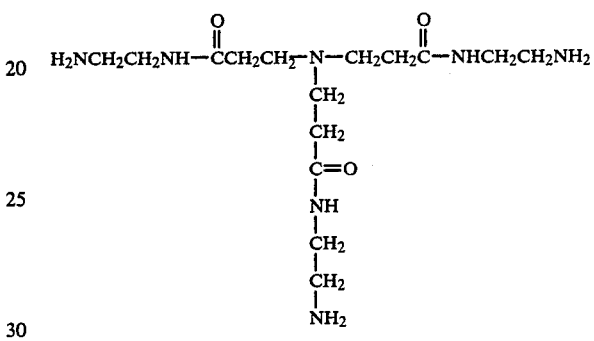

To make the products of the present invention, at least one of the amine hydrogens must be substituted with one of the previously identified groups (designated as Z) other than hydrogen.

The initiating polyamines which may be used in place of ammonia are the ethylene or propylene series of polyamines. Thus, ethylenediamine (EDA), diethylenetriamine (DETA), triethylenetetramine (TETA), propylene diamine (PDA), dipropylenetriamine (DPTE) and the like can be employed. The α,Ω-diamines, as well as the vicinal diamines enumerated above, can be employed as the initiating polyamine to make the precursor compounds of the compositions of the present invention. For example, 1,3-diaminopropane, 1,4-diaminobutane and the like α,Ω-diamines can be used. The initiating compound is reacted by the addition of the amine to an unsaturated ester such as methyl acrylate (MA).

The same amines employed as initiating compounds are also employed as the capping compound to form the amido linkage by reacting with the ester functionality.

An example of the structure of the EDA (PDA) initiated polymer reacted with MA and capped with EDA (PDA) is:

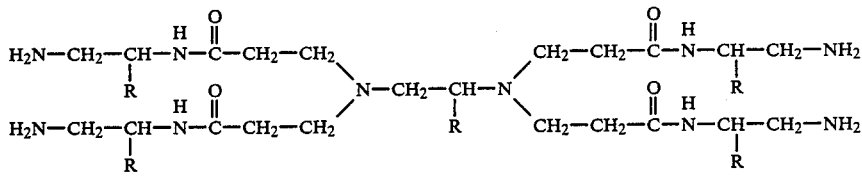
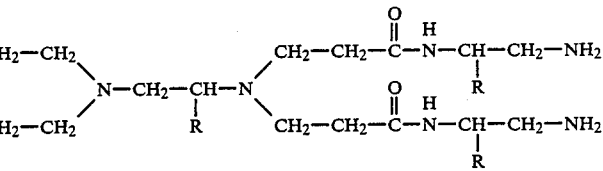

wherein R is hydrogen or a methyl group.

The α,Ω-diamines would form similar structures. It should be recognized that, while the capping amine can be the same as the initiating one, it is not necessarily so.

Thus, DETA or TETA can initiate a polymer capped with the simpler polyamine, EDA. Ammonia is not used for capping although it is a good initiating compound.

It should be recognized that the terminal amine nitrogens can be further reacted with an unsaturated ester

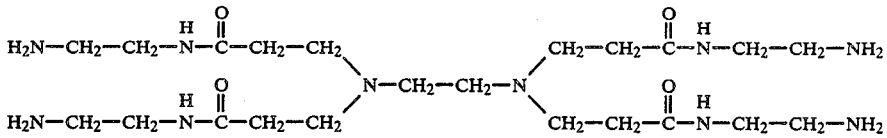

and, in turn, with another amine to make a larger and more complex molecule as suggested by the formula shown in the Summary of the Invention section. These larger polymer molecules may be linear or branched. Molecular weight of the polyamidoamine precursors of the chelating and/or inhibiting agents of this disclosure were determined by gel permeation chromatography.

The preferred compounds are those which have all or most of the amine hydrogens substituted with an alkyl phosphonic acid group or a salt thereof.

Examples of the preparation and use of the products of the invention are shown following:

EXAMPLE 1

Deionized water (20 g) and 37.1 g of a 61% aqueous solution of an ethylenediamine initiated linear polyamidoamine (mol. wt. ~7300) were weighed into a 500 ml round-bottom reaction flask equipped with a water-cooled reflux condenser, mechanical stirrer, thermometer with a temperature controller, and an addition funnel. Approximately 100 g of concentrated HCl solution and 39.5 g of phosphorous acid were added to the aqueous amine solution and the reaction mixture heated to reflux and maintained for one hour. Aqueous 37% formaldehyde solution (34.1 g) was added from the addition funnel over a one-hour period. The reaction mixture was heated at reflux for an additional four hours and then cooled. The product was the completely phosphonomethylated derivative of the linear polyamidoamine.

EXAMPLE 2

The procedure of Example 1 was followed except 43.1 g of 60% aqueous solution of an ethylenediamine-initiated polyamidoamine (mol. wt. ~7300) that had been reacted with 10 mole % 3-chloro-2-hydroxypropyltrimethylammonium chloride was used. This made a product in which 10% of the amine hydrogens had been replaced with 2-hydroxy-3(trimethyl ammonium chloride) propyl group. This partially quaternized amine was then phosphonomethylated by reacting the remainder of the amine nitrogens with phosphorous acid (37.8 g), 32.4 g of 37% formaldehyde solution, and 100 g of concentrated hydrochloric acid.

EXAMPLE 3

The procedure of Example 1 was followed, but using 37.0 g of 64% aqueous solution of an ethylenediamine-initiated polyamidoamine (mol. wt. ~4600) that had been modified with 10 mole % of hydroxyethyl functionality by reaction with ethylene oxide. The remaining amine nitrogens were phosphomomethylated by reacting with 37.8 g of phosphorous acid, 32.4 g of 37% formaldehyde solution, and 100 g of concentrated hydrochloric acid.

EXAMPLE 4

The procedure of Example 1 was used to react an ethylenediamine-initiated polyamidoamine having the structure with 7 mole equivalents of $H_3PO_3$ and $CH_2O$ in the presence of HCl. The product was a partially phosphonomethylated polyamidoamine, the remaining amine nitrogens being unsubstituted.

EXAMPLE 5

The procedure of Example 1 was used to react a diethylenetriamine-initiated polyamidoamine with 7 mole equivalents of $H_3PO_3$ and $CH_2O$ in the presence of HCl. The product has a structure essentially that of Example 4 except for the initiating amine (DETA). The product was partially phosphonomethylated as in Example 4.

EXAMPLE 6

The procedure of Example 1 was used to react an ammonia-initiated and EDA capped polyamidoamine with 6 mole equivalents of $H_3PO_3$ and $CH_2O$ in the presence of HCl. This gave a partially (66%) phosphonomethylated product.

EXAMPLE 7

The ammonia initiated amine of Example 6 was phosphonomethylated using 9 mole equivalents of $H_3PO_3$ and $CH_2O$ in the presence of HCl. This product was completely phosphonomethylated.

EXAMPLE 8

The ammonia-initiated amine of Example 6 was carboxymethylated using 6 mole equivalents of glycolonitrile in the presence of excess caustic. The product was a partially (~66%) carboxylated amidoamine.

EXAMPLE 9

The procedure of Example 1 was used to react an ammonia-initiated polyamidoamine (approximate molecular weight of 1400) with 21 mole equivalents of $CH_2O$ and $H_3PO_3$ in the presence of HCl. The product was partially phosphonomethylated.

EXAMPLE 10

The polyamidoamine of Example 9 was reacted with 6 mole equivalents of $CH_2O$ and $H_3PO_3$ in the presence of HCl and then carboxymethylated with 6 mole equivalents of glycolonitrile in the presence of excess caustic. The amine hydrogens were partially replaced with equal amounts of carboxymethyl and methylene phosphonic acid groups, but leaving somewhat more than 55% hydrogens.

CALCIUM SCALE INHIBITOR TEST

The compounds were evaluated as scale inhibitors for calcium sulfate scale according to the National Association of Corrosion Engineers test method TM-03-74. The results are shown in Table I and compared to a commercially available scale inhibition compound, aminotri(methylenephosphonic acid).

TABLE I

Scale Inhibition Data

| Compound | Concentration* (ppm) | % of Ca++ Remaining in Solution | | |
|---|---|---|---|---|
| | | 24 Hrs | 48 Hrs | 72 Hrs |
| Blank (none) | 10 | 70 | 66 | 66 |
| Example 1 | 10 | 100 | 99 | 99 |
| Example 2 | 10 | 100 | 98 | 93 |
| Example 3 | 10 | 99 | 98 | 97 |
| Example 4 | 10 | 96 | 89 | 83 |
| Example 5 | 10 | 100 | 99 | 99 |
| Example 6 | 10 | 94 | 86 | 77 |
| Example 7 | 10 | 99 | 98 | 97 |
| Example 8 | 10 | 72 | 71 | 69 |
| Example 9 | 10 | 96 | 91 | 86 |
| Example 10 | 10 | 73 | 69 | 66 |
| Aminotri(methylenephosphonic acid) | 10 | 82 | 80 | 77 |

*ppm based on active acid content

The compounds of this invention can also function as sequestering/chelating agents. Thus, certain of the above compounds were titrated with standard copper solution in the presence of chrome azurol-S indicator.

The compound of Example 8 complexed ~2 moles of copper per mole of ligand. The compound of Example 7 complexed 5 moles of copper per mole of ligand.

It should be noted that while Examples 8 and 10 in Table I were not good threshold agents, they are satisfactory as chelating or sequestering agents.

We claim:

1. A polymer having the structure

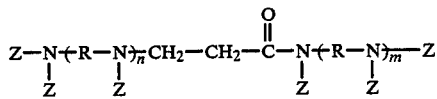

wherein Z is at least one of

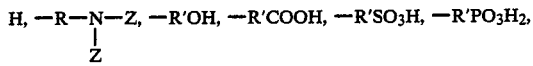

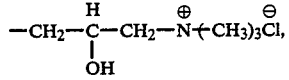

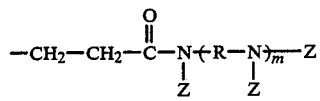

and wherein the acid groups alternatively are in the form of alkali, alkaline earth or ammonium salts, R and R' are saturated hydrocarbon residues having from 1 to 6 and 1 to 4 carbon atoms, respectively, and m and n are 0 to 10 and wherein at least one Z is other than hydrogen.

2. The polymers of claim 1 wherein R is a 2-carbon residue, n is 0 and m is 1.

3. The polymers of claim 2 wherein at least one Z substituent is —R'PO$_3$H$_2$.

4. The polymers of claim 3 wherein R' is a —CH$_2$— group.

5. The polymers of claim 2 wherein at least about two-thirds of the Z substituents are —R'COOH.

6. The polymers of claim 5 wherein R' is a —CH$_2$— group.

7. The polymers of claim 3 wherein at least about two-thirds of the Z substituents are —R'PO$_3$H$_2$.

8. The polymers of claim 7 wherein R' is a —CH$_2$— group.

9. The polymers of claim 1 wherein R is a 2-carbon residue, n is 1 and m is 1.

10. The polymers of claim 9 wherein at least one Z substituent is —R'PO$_3$H$_2$.

11. The polymers of claim 10 wherein R' of the phosphorus-containing group is a —CH$_2$— group.

12. The polymers of claim 10 wherein at least about two-thirds of the Z substituents are —R'PO$_3$H$_2$.

13. The polymers of claim 12 wherein R' of the phosphorus-containing group is a —CH$_2$— group.

14. The polymers of claim 9 wherein at least about two-thirds of the Z substituents are —R'COOH.

15. The polymers of claim 14 wherein R' of the carboxyl-containing group is a —CH$_2$— group.

16. The polymers of claim 9 which are linear polymers having the repeating Z unit

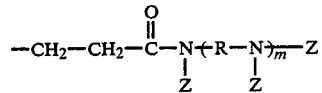

17. The polymers of claim 16 wherein the polyamidoamine has a molecular weight of about 4600 as determined by gel permeation chromatography.

18. The polymers of claim 16 wherein the polyamidoamine has a molecular weight of about 7300 as determined by gel permeation chromatography.

19. The polymers of claim 17 wherein the remaining Z substituents are —R'PO$_3$H$_2$.

20. The polymers of claim 19 wherein R' is a —CH$_2$— group.

21. The polymers of claim 18 wherein the remaining Z substituents are —R'PO$_3$H$_2$.

22. The polymers of claim 21 wherein R' is a —CH$_2$— group.

23. The polymers of claim 7 wherein the remaining Z substituents are —R'PO$_3$H$_2$.

24. The polymers of claim 23 wherein R' is a —CH$_2$— group.

25. The polymers of claim 16 wherein about 10% of the amine hydrogens are substituted with a 2-hydroxy-3(trimethylammonium chloride)propyl group.

26. The polymers of claim 18 wherein about 10% of the amine hydrogens are substituted with a 2-hydroxy-3(trimethylammonium chloride)propyl group.

27. The polymers of claim 16 wherein about 10% of the amine hydrogens are substituted with a hydroxyethyl group.

28. The polymers of claim 17 wherein about 10% of the amine hydrogens are substituted with a hydroxyethyl group.

29. The polymers of claim 28 wherein the remaining amine hydrogens are phosphonomethylated.

* * * * *